US005588414A

United States Patent [19]

Hrytzak et al.

[11] Patent Number: 5,588,414

[45] Date of Patent: Dec. 31, 1996

[54] CONSTRUCTION FOR MAINTAINING ASSEMBLED AXIAL INTEGRITY OF AN ELECTRICALLY ACTUATED VALVE

[75] Inventors: Bernard J. Hrytzak, Chatham, Canada; Takeshi Gomi, Saitama, Japan; Hirotomi Nemoto, Saitama, Japan; Yoshio Yamamoto, Saitama, Japan

[73] Assignees: Siemens Electric Limited, Ontario, Canada; Honda Giken Kogyo Kabushiki Kaisha, Tokyo, Japan

[21] Appl. No.: 520,543

[22] Filed: Aug. 29, 1995

[51] Int. Cl.[6] .......................... F02M 25/07; F16K 37/00; H01F 7/08

[52] U.S. Cl. ...................... 123/571; 251/129.15; 335/278

[58] Field of Search ...................... 123/571; 251/129.15, 251/129.16, 129.17; 335/219, 220, 221, 236, 255, 278, 279

[56] References Cited

U.S. PATENT DOCUMENTS

| | | | |
|---|---|---|---|
| 4,694,812 | 9/1987 | Wendt | 123/571 |
| 4,805,582 | 2/1989 | Braun et al. | 123/571 |
| 5,129,623 | 7/1992 | Lockwood | 123/571 |
| 5,277,399 | 1/1994 | McCabe | 251/129.15 |
| 5,435,519 | 7/1995 | Everingham | 251/129.15 |
| 5,460,146 | 10/1995 | Frankenberg | 123/571 |
| 5,467,962 | 11/1995 | Bircann et al. | 251/129.15 |
| 5,494,255 | 2/1996 | Pearson et al. | 123/571 |

*Primary Examiner*—Willis R. Wolfe

[57] ABSTRACT

A circular metal clinch ring (36) secures a cap (26) to a shell (24) of an EEGR valve (20). The clinch ring has a plurality of integral sharp pointed barbs (210) that partially embed in polymeric material of the cap. The ring constrains the shell and cap against relative axial and circumferential movement, with some barbs being pointed in one sense and others in the opposite sense to resist relative circumferential movement between the cap and the shell in both circumferential senses. A wave spring washer (186) is disposed to maintain the axial position of the bobbin-mounted solenoid coil (70) within the valve.

13 Claims, 4 Drawing Sheets

CONSTRUCTION FOR MAINTAINING ASSEMBLED AXIAL INTEGRITY OF AN ELECTRICALLY ACTUATED VALVE

FIELD OF THE INVENTION

This invention relates generally to electrically actuated valves, and in particular to a construction that is effective to maintain the assembled axial integrity of certain components of such a valve so that valve operating performance does not degrade in harsh operating environments due to inability of the valve to maintain important axial relationships that are imparted to the valve at the time of its manufacture.

BACKGROUND AND SUMMARY OF THE INVENTION

Many electrically actuated valves are subjected to rather harsh operating environments. Valves that are used in automotive vehicles are in this category and those that are mounted on, or in proximity to, a vehicle's engine are apt to experience perhaps the harshest environment. One such valve is an electric exhaust gas recirculation (EEGR) valve of the type used in exhaust emission control of internal combustion engines.

Exhaust gas recirculation is a technique that is used to reduce the oxides of nitrogen content of internal combustion engine exhaust gases. An EGR valve controls the amount of exhaust gas that is allowed to recirculate and mix with a fresh air-fuel induction stream that enters combustion chamber space of an engine, and is typically mounted directly on the engine. One type of electric actuator for such a valve is a solenoid actuator. The solenoid assembly comprises a bobbin-mounted electromagnet coil that is electrically connected to terminals of an electrical connector plug via which the valve electrically connects to an electrical control system for the engine.

In a valve that has an end closure cap that is assembled to an otherwise open axial end of a cylindrical shell that houses the electric actuator portion of the valve, magnet wire ends can be directly attached to bobbin-mounted terminals which in turn mate with terminals mounted in such an end closure cap. Ends of the closure-mounted terminals that are opposite the ends mated with the bobbin-mounted terminals are surrounded by a shell integrally formed in the end closure cap to create the electric connector plug via which the valve connects to the engine electrical control system. Such a construction provides assembly convenience and efficiency since the mating of the closure cap terminals to the bobbin terminals occurs as the closure cap is being assembled to the shell.

The present invention relates to a novel construction for maintaining the assembled axial integrity of such a valve, including a special metal clinch ring and a conventional O-ring seal where the end closure cap is assembled to the shell. Also a wave spring washer is placed in cooperative association between the bobbin and associated magnetic circuit structure to assure maintenance of axial location of the bobbin relative to such magnetic circuit structure. Thus, the invention combines assembly convenience with maintenance of assembled axial integrity so that valve operating performance does not degrade in harsh operating environments due to inability of the valve to maintain important axial relationships that are imparted to the valve at the time of its manufacture.

The foregoing, along with further advantages, features, and benefits of the invention, and the inventive principles are disclosed in the ensuing description of details of a specific embodiment that represents the best mode contemplated at this time for carrying out the invention. The drawings that accompany the disclosure depict in particular detail a presently preferred exemplary embodiment of the invention.

DESCRIPTION OF THE PREFERRED EMBODIMENT

Figure 1:
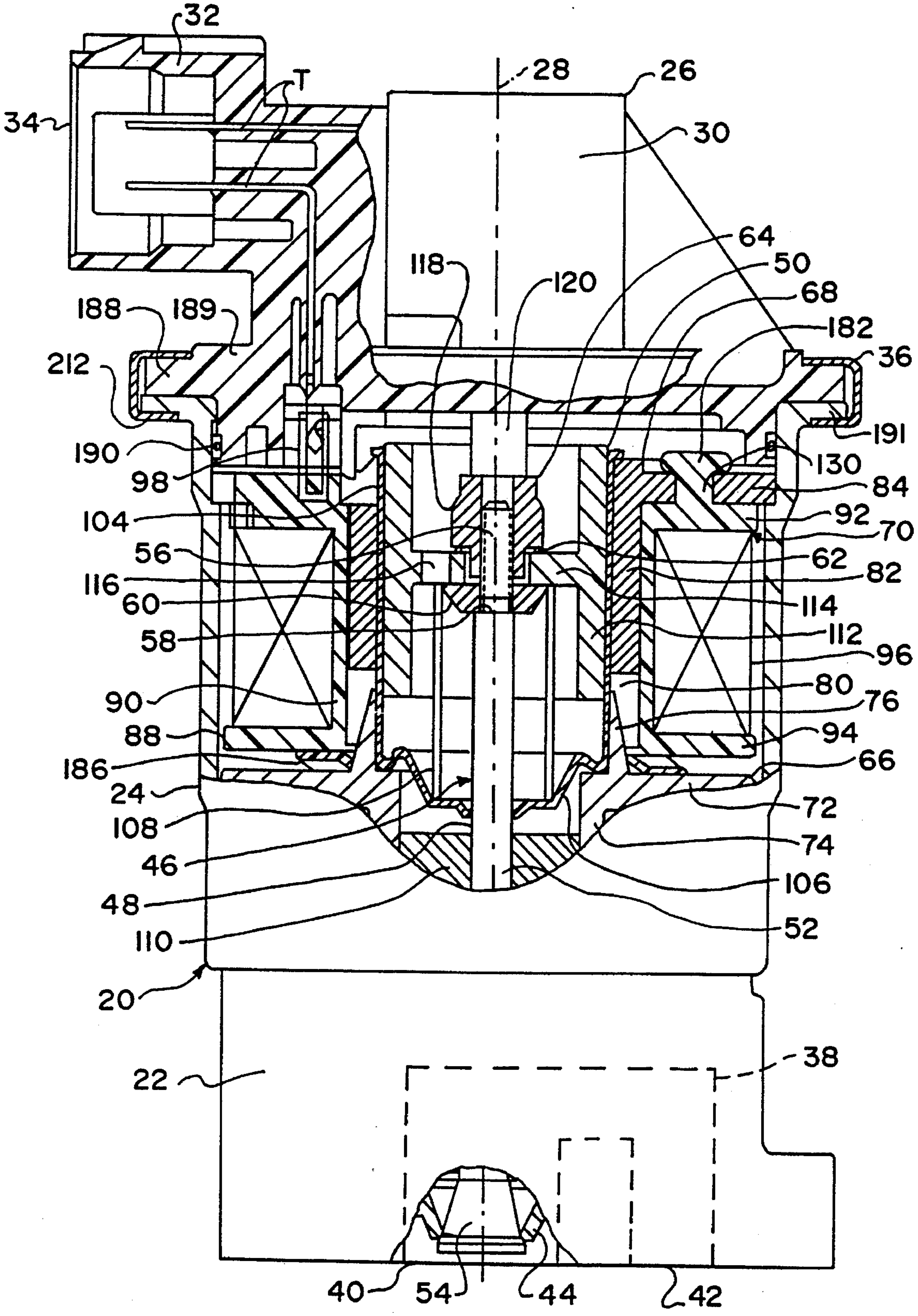
FIG. 1 is a longitudinal view, partly in cross section, of an electric EGR valve (EEGR valve) embodying principles of the invention.

The drawing Figs. illustrate principles of the present invention in an exemplary electric EGR valve (EEGR valve) 20. FIG. 1 shows the general arrangement of EEGR valve 20 to comprise a metal base 22, a generally cylindrical metal shell 24 disposed on top of and secured to base 22, and a sensor cap 26 forming a closure for the otherwise open top of shell 24.

Base 22 comprises a flat bottom surface adapted to be disposed against a surface of an exhaust manifold of an internal combustion engine, typically sandwiching a suitably shaped gasket (not shown) between itself and the manifold. Base 22 comprises a flange having through-holes (not shown) that provide for the separable attachment of EEGR valve 20 to an exhaust manifold. For example, the manifold may contain a pair of threaded studs which pass through the flange through-holes and onto the free ends of which lock washers are first placed, followed by nuts that are threaded onto the studs and tightened to force base 22 toward the manifold, thereby creating a leak-proof joint between valve 20 and the manifold. Reference numeral 28 designates a main longitudinal axis of EEGR valve 20.

Sensor cap 26 is a non-metallic part, preferably fabricated from suitable polymeric material. In addition to providing a closure for the otherwise open top end of shell 24, sensor cap 26 comprises a central cylindrical tower 30 and an electrical connector shell 32 that projects radially outwardly from tower 30. Tower 30 has a hollow interior shaped to house a position sensor that is utilized for sensing the extent to which EEGR valve 20 is open. Sensor cap 26 further contains several electrical terminals T that provide for a solenoid coil assembly (to be described later) and such a sensor to be operatively connected with an engine electrical control system. Ends of terminals T are surrounded by shell 32 to form an electrical connector plug 34 that is adapted to mate with a mating plug (not shown) of an electrical wiring harness of an engine electrical control system. A metal clinch ring 36 that forms part of the inventive subject matter (to be described in detail later) securely attaches sensor cap 26 to shell 24.

Base 22 comprises an exhaust gas passageway 38 having an entrance 40 coaxial with axis 28 and an exit 42 that is spaced radially from entrance 40. Both entrance 40 and exit 42 register with respective passages in an engine exhaust manifold.

A valve seat 44 is disposed in passageway 38 coaxial with entrance 40. An armature-pintle assembly 46 that is also coaxial with axis 28 comprises a pintle 48 and an armature 50. Pintle 48 comprises a shaft 52 having a valve head 54 at the lower end and a threaded stud 56 at the upper end, and a shoulder 58. Valve head 54 is shaped for cooperation with an annular seat surface provided in seat 44 by a central through-opening in seat 44. Threaded stud 56 provides for attachment of pintle 48 to armature 50 by attachment means that includes an annular shim 60, a wave spring washer 62, and a nut 64. FIG. 1 depicts the closed position of EEGR valve 20 wherein valve head 54 is seated closed on seat 44.

EEGR valve 20 further comprises a lower stator member 66, an upper stator member 68, and a solenoid coil assembly 70. Lower stator member 66 comprises a circular flange 72 immediately below which is a smaller diameter cylindrical wall 74 and immediately above which is a tapered cylindrical wall 76. A through-hole extends centrally through member 66 and comprises a right angle shoulder at the base of wall 76 where it joins with flange 72.

Figure 2:
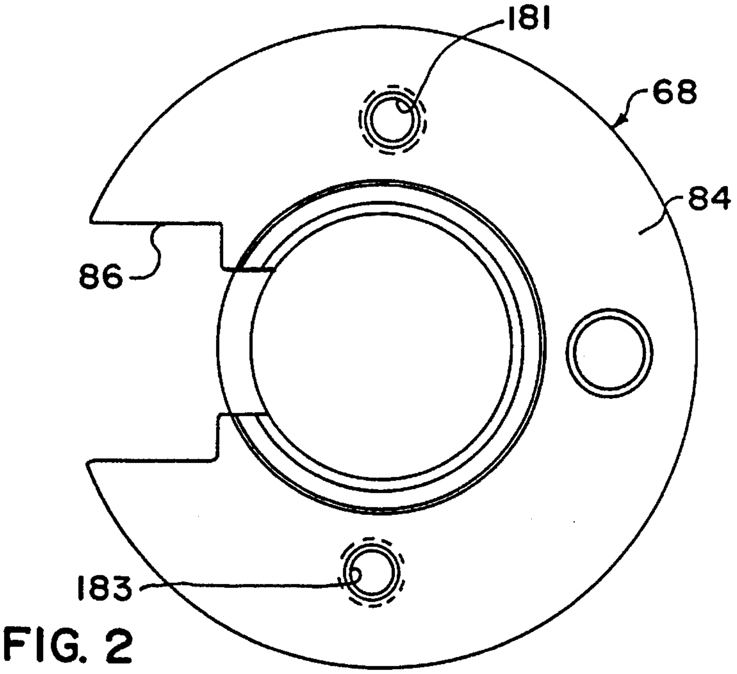
FIG. 2 is a top plan view of one of the parts of the EEGR valve shown by itself, namely an upper stator member.

Upper stator member 68 is cooperatively associated with lower stator member 66 to provide an air gap 80 in the magnetic circuit. Member 68 comprises a straight cylindrical side wall 82 having a flange 84 extending around its outside proximate its upper end. A slot 86 (FIG. 2) in a portion of flange 84 provides a clearance for an electrical connection from solenoid coil assembly 70 to certain terminals T of connector plug 34.

Solenoid coil assembly 70 is disposed within shell 24 between stator members 66 and 68. Solenoid coil assembly 70 comprises a non-metallic bobbin 88 having a straight cylindrical tubular core 90 coaxial with axis 28, and upper and lower generally circular flanges 92, 94 respectively at the opposite axial ends of core 90. A length of magnet wire is wound on core 90 between flanges 92, 94 to form an electromagnet coil 96.

Bobbin 88 is preferably an injection-molded plastic that possesses dimensional stability over a range of temperature extremes that are typically encountered in automotive engine usage. Two electrical terminals 98 (only one of which appears in FIG. 1) are mounted in respective upwardly open sockets on the upper face of upper bobbin flange 92, and a respective end segment of the magnet wire forming coil 96 is electrically connected to a respective one of the terminals 98.

A portion of armature 50 axially spans air gap 80, radially inward of walls 76 and 82. A non-magnetic sleeve 104 is disposed in cooperative association with the two stator members 66, 68 and armature-pintle assembly 46. Sleeve 104 has a straight cylindrical wall to keep armature 50 separated from the two stator members 66, 68. Sleeve 104 also has a lower end wall 106 that is shaped to provide a cup-shaped spring seat for seating a lower axial end of a helical coil spring 108, to provide a small circular hole for passage of pintle shaft 52, and to provide a stop for limiting the downward travel of armature 50.

Guidance of the travel of armature-pintle assembly 46 along axis 28 is provided by a central through-hole in a bearing guide member 110 that is press fit centrally to lower stator member 66. Pintle shaft 52 has a precise, but low friction, sliding fit in the bearing guide member hole.

Armature 50 is ferromagnetic and comprises a cylindrical wall 112 coaxial with axis 28 and a transverse internal wall 114 across the interior of wall 112 at about the middle of the length of wall 112. Wall 114 has a central circular hole that provides for the upper end of pintle 48 to be attached to armature 50 by fastening means that includes shim 60, wave spring washer 62, and nut 64. Wall 114 also has smaller bleed holes 116 spaced outwardly from, and uniformly around, its central circular hole.

Shim 60 serves to provide for passage of the upper end portion of pintle 48, to provide a locator for the upper end of spring 108 to be substantially centered for bearing against the lower surface of wall 114, and to set a desired axial positioning of armature 50 relative to air gap 80.

The O.D. of nut 64 comprises straight cylindrical end portions between which is a larger polygonally shaped portion 118 (i.e. a hex). The lower end portion of nut 64 has an O.D. that provides some radial clearance to the central hole in armature wall 114. When nut 64 is threaded onto threaded stud 56, wave spring washer 62 is axially compressed between the lower shoulder of hex 118 and the surface of wall 114 surrounding the central hole in wall 114. The nut is tightened to a condition where shoulder 58 engages shim 60 to force the flat upper end surface of shim 60 to bear with a certain force against the flat lower surface of wall 114. Nut 64 does not however abut shim 60. Wave spring washer 62 is, at that time, not fully axially compressed, and this type of joint allows armature 50 to position itself within sleeve 104 to better align to the guidance of the pintle that is established by bearing guide member 110. Hysteresis is minimized by minimizing any side loads transmitted from the pintle to the armature, or from the armature to the pintle, as the valve operates. The disclosed means for attachment of the pintle to the armature is highly effective for this purpose.

The closed position shown in FIG. 1 occurs when solenoid coil assembly 70 is not being energized by electric current from the engine electrical control system. In this condition, force delivered by spring 108 causes valve head 54 to be seated closed on seat 44. A plunger 120 associated with the position sensor contained within tower 30 of sensor cap 26 is self-biased against the flat upper end surface of nut 64.

As solenoid coil assembly 70 is increasingly energized by electric current from the engine control system, magnetic flux increasingly builds in the magnetic circuit comprising the two stator members 66, 68 and shell 24, interacting with armature 50 at air gap 80 through non-magnetic sleeve 104. This creates increasing magnetic downward force acting on armature 50, causing valve head 54 to increasingly open exhaust gas passageway 38 to flow. Bleed holes 116 assure that air pressure is equalized on opposite sides of the armature as the armature moves. Concurrently, spring 108 is being increasingly compressed, and the self-biased plunger 120 maintains contact with nut 64 so that the position sensor faithfully follows positioning of armature-pintle assembly 46 to signal to the engine control system the extent to which the valve is open.

FIG. 1 shows one of two upstanding posts 130 that are diametrically opposite each other on the upper face of the upper bobbin flange. Posts 130 pass through corresponding through-holes 181, 183 (FIG. 2) in flange 84 of upper stator member 68. FIG. 1 shows the condition of the posts after having been passed through the flange through-holes 181, 183 so that the upper face of upper bobbin flange 92 is disposed flat against the lower face of upper stator flange 84. In this condition, the ends of the posts have been deformed from their previous straight shape that allowed them to pass through the flange through-holes 181, 183, to create mushroomed heads 182 that are against the upper stator flange to capture the stator flange between themselves and the upper bobbin flange. It should be noted that FIG. 1 shows one post 130 and its head 182 ninety degrees out of position circumferentially, for illustrative clarity only.

Figure 3:
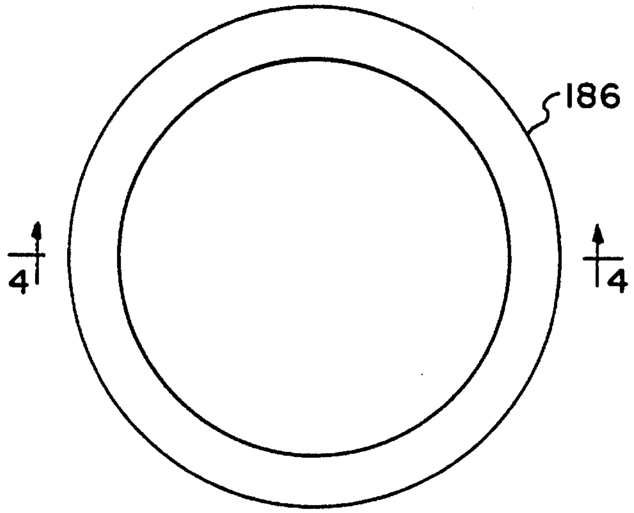
FIG. 3 is a top plan view of another of the parts of the EEGR valve shown by itself, namely a wave spring washer.
Figure 4:
FIG. 4 is a cross section view in the direction of arrows 4—4 in FIG. 3.

A wave spring washer 186 shown in FIGS. 3 and 4 is disposed around the outside of wall 76 and slightly compressed between lower bobbin flange 94 and flange 72 of lower stator member 66. Wave spring washer 186 serves to assure that upper bobbin flange 92 is maintained against upper stator flange 84 should there be any looseness in the bobbin flange attachment to the upper stator flange provided by posts 130 and heads 182. Under extremely harsh operating conditions, the polymeric material of the bobbin and its two integral posts 130 with their heads 182 might experience expansion and/or creep that would cause looseness, but this is prevented by the action of wave spring washer 186 keeping the upper bobbin flange against the upper stator flange. This represents one of the inventive aspects of maintaining assembled axial integrity of valve 20.

Another inventive aspect of maintaining such integrity is provided by clinch ring 36. Clinch ring 36 engages an outer perimeter rim 188 of a wall 189 of cap 26 to securely attach the cap to shell 24 with radial sealing of the cap to the shell being provided by an O-ring seal 190 disposed in a radially outwardly open groove extending circularly around a portion the cap wall that is below and radially inwardly of rim 188. O-ring seal 190 provides a radial seal between the cap and the inside wall of shell 24 proximate the shell's axial end which comprises a radially outwardly directed rim 191.

Figure 5:
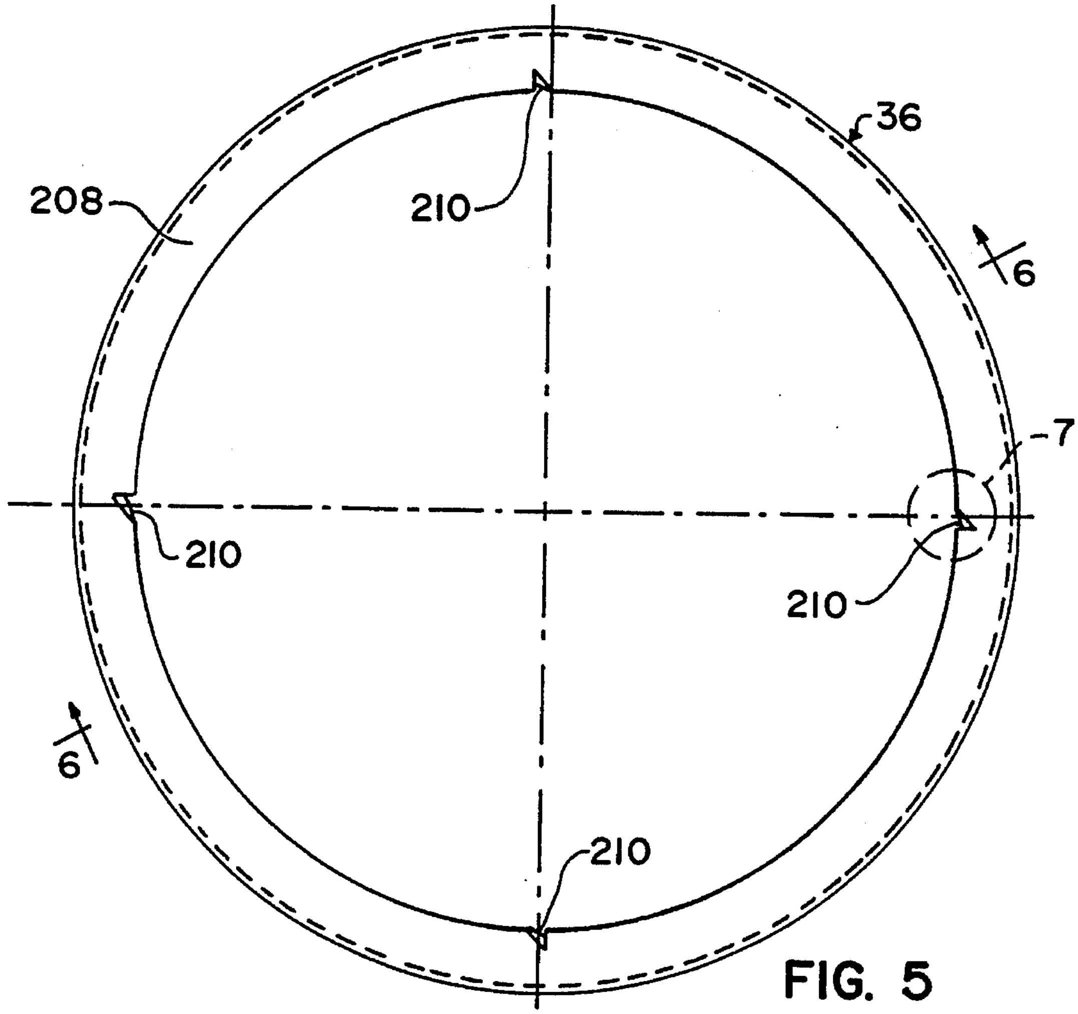
FIG. 5 is a top plan view of yet another part of the EEGR valve shown by itself in a condition prior to assembly to the EEGR valve, namely a clinch ring .
Figure 6:
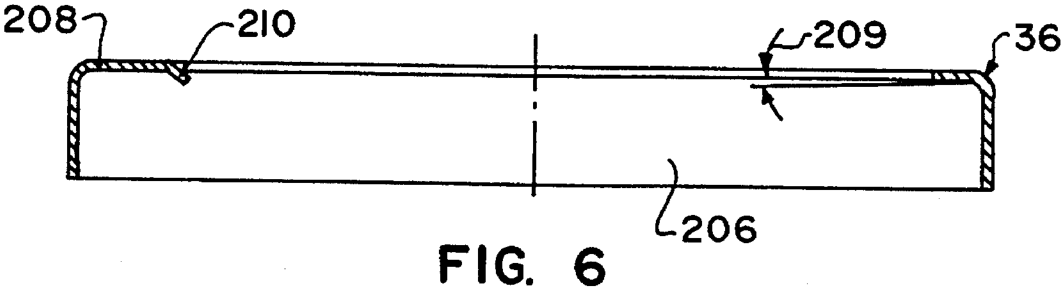
FIG. 6 is a cross sectional view as taken in the direction of arrows 6—6 in FIG. 5.
Figure 7:
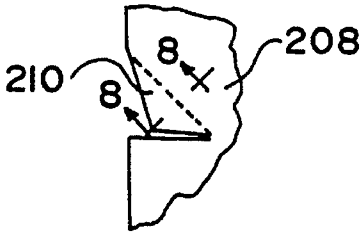
FIG. 7 is an enlarged fragmentary view in circle 7 of FIG. 5.
Figure 8:
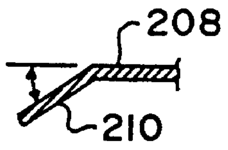
FIG. 8 is a fragmentary cross sectional view as taken in the direction of arrows 8—8 in FIG. 7.

FIGS. 5–8 show the shape of clinch ring 36 prior to its being formed to the shape shown in FIG. 1. It comprises a cylindrical side wall 206 and an upper circular flange 208 projecting radially inward from the upper end of the side wall. FIG. 6 shows at 209 that flange 208 is at slightly less than a right angle to side wall 206. The radially inner edge of flange 208 also contains integral downward turned pointed barbs 210, the illustrated embodiment having four such barbs at ninety degree intervals around the ring. These barbs will bite slightly into the polymeric material of cap rim 188 in the finished valve to also aid in resisting rotational movement of cap 26 relative to shell 24.

After the clinch ring, in the condition of FIGS. 5 and 6, has been placed over cap 26, and the cap has been has been placed onto the top of shell 24 so that the respective rims 188, 191 are abutting, sidewall 206 is disposed radially outward of the abutting rims. The lower portion of sidewall 206 is then turned inwardly to the position shown by FIG. 1 where it forms a flange 212 disposed against the lower surface of the shell's rim. The above-described initial shape of clinch ring 36 results in a final shape that applies an axial holding force that effectively immovably clamps the two parts 24, 26 together, so that neither axial nor circumferential movement between them can occur.

Figure 9:
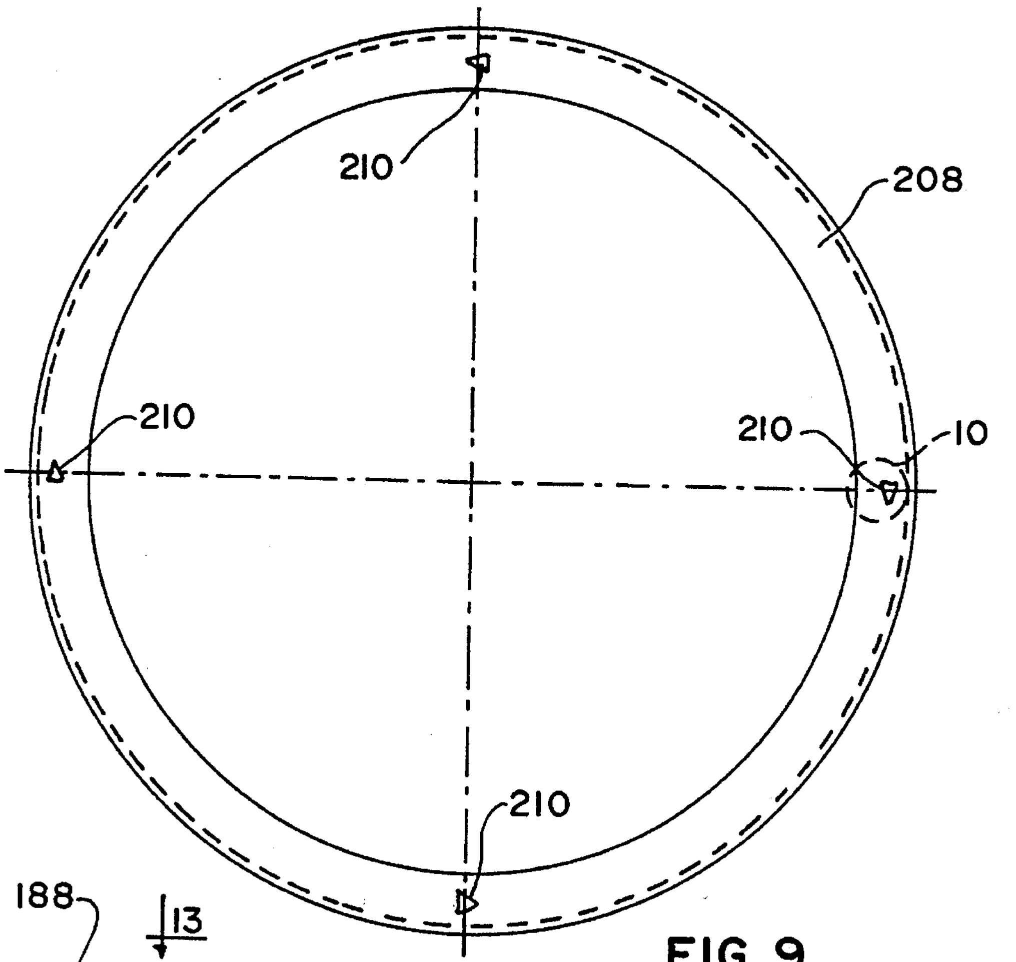
FIGS. 9, 10, and 11 are views of another form of clinch ring corresponding to the views of FIGS. 5, 7, and 8 respectively.
Figure 10:
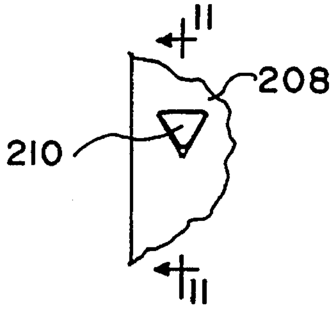
Figure 11:
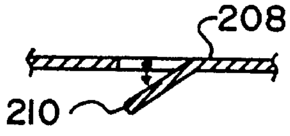

FIG. 9–11 show an alternate form of clinch ring which is like the one of FIGS. 5–8, but for the shape and location of the pointed barbs 210. In the alternate form, the barbs are lanced from material of flange 208 that is spaced inwardly from the flange's inner edge. Each barb points circumferentially as viewed in plan and is symmetrical about its pointed tip. Two of the barbs point in one circumferential sense while the other two point in the opposite circumferential sense.

Figure 12:
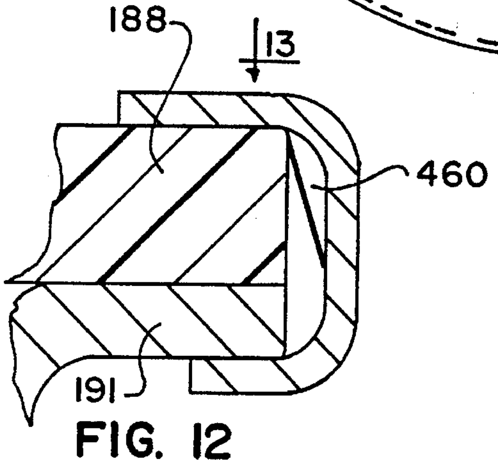
FIG. 12 is an enlarged fragmentary cross section view in the same direction as FIG. 1 showing yet another form of clinch ring.
Figure 13:
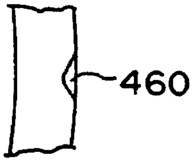
FIG. 13 is a fragmentary view in the direction of arrow 13 in FIG. 12 on a reduced scale.
Figure 14:
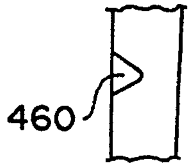
FIG. 14 is a right side view of FIG. 13.

FIGS. 12–14 show yet another form of clinch ring which has a number of circumferentially spaced embossments 460, instead of the barbs 210. The embossments are formed by displacing material from the top flange and the side of the clinch ring at their junction. Immediately proximate the top flange, each embossment will engage the outer edge of rim 188 of the cap bottom wall when the clinch ring is clinched onto the abutting rims 188, 191 of the cop and shell.

The clinch rings are preferably fabricated by conventional metalworking and treatment procedures from stainless steel that is annealed after forming and cooled in a controlled atmosphere to prevent oxidation. The manner by which a clinch ring secures cap 26 on shell 24 serves to maintain axial integrity of the cap to the shell.

While the foregoing has disclosed a presently preferred embodiment of the invention, it should be understood that the inventive principles are applicable to other equivalent embodiments that fall within the scope of the following claims.

What is claimed is:

1. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, said enclosure comprising a shell having a sidewall terminating at an axial end axially beyond said electric actuator relative to said valve mechanism, said axial end comprising a radially outwardly directed rim, a closure closing said axial end and having a rim of polymeric material disposed against said rim of said axial end of said shell sidewall, and means for clinching said rims in assembly comprising a circular ring having a sidewall disposed radially outward of and axially overlapping both said rims, said circular ring comprising a first flange directed radially inwardly of said ring's sidewall to radially overlap said rim of said closure and a second flange directed radially inwardly of said ring's sidewall to radially overlap said rim of said axial end of said shell sidewall, and said circular ring further comprising a plurality of circumferentially arranged sharp pointed barbs that bite into the polymeric material of said closure rim, and said ring exerting axial forces forcing said rims axially together.

2. An EEGR valve as set forth in claim 1 in which at least one of said sharp pointed barbs points in one circumferential sense and at least another points in the opposite circumferential sense.

3. An EEGR valve as set forth in claim 2 in which two of said barbs that are diametrically opposite each other point in the one circumferential sense and two other of said barbs that are diametrically opposite each other, and orthogonal to said first two barbs, point in the opposite circumferential sense.

4. An EEGR valve as set forth in claim 1 wherein said barbs are at a radially inner edge of said first flange.

5. An EEGR valve as set forth in claim 1 wherein said barbs are spaced radially outward of a radially inner edge of said first flange.

6. An EEGR valve as set forth in claim 1 in which said first flange is disposed at an acute angle to said ring's sidewall when said ring is in a free condition prior to assembly to the valve.

7. An EEGR valve as set forth in claim 1 further including an O-ring seal disposed to seal between said closure and said shell sidewall.

8. An EEGR valve as set forth in claim 7 in which said O-ring seal is arranged as a radial seal that is disposed in a circumferential groove in one of said closure and said shell sidewall.

9. An EEGR valve as set forth in claim 8 in which said groove is disposed in said closure axially beyond said shell sidewall rim relative to said closure rim.

10. An EEGR valve as set forth in claim 1 in which said electric actuator comprises a bobbin-mounted solenoid coil and associated stator structure including a radial flange, and further including a wave spring washer disposed to act on said bobbin-mounted solenoid coil to urge said bobbin-mounted coil against said radial flange of said stator structure.

11. An EEGR valve as set forth in claim 10 in which a flange of the bobbin of said bobbin-mounted solenoid coil is disposed against and joined to said radial flange of said stator structure, and said wave spring washer is disposed to act on said bobbin-mounted solenoid coil to urge said bobbin flange against said radial flange of said stator structure.

12. An electric exhaust gas recirculation (EEGR) valve for an internal combustion engine comprising an enclosure including a base, an entrance at which engine exhaust gas to be recirculated enters said base, a passage that extends through said base for conveying engine exhaust gas that has entered said entrance, an exit at which engine exhaust gas that has passed through said passage exits said base, a valve mechanism disposed within said base for controlling flow through said passage, an electric actuator disposed within said enclosure for operating said valve mechanism, in which said electric actuator comprises a bobbin-mounted solenoid coil and associated stator structure including a radial flange, and further including a wave spring washer disposed to act on said bobbin-mounted solenoid coil to urge said bobbin-mounted coil against said radial flange of said stator structure.

13. An EEGR valve as set forth in claim 12 in which a flange of the bobbin of said bobbin-mounted solenoid coil is disposed against and joined to said radial flange of said stator structure, and said wave spring washer is disposed to act on said bobbin-mounted solenoid coil to urge said bobbin flange against said radial flange of said stator structure.

* * * * *